US010614319B2

United States Patent
Douglas et al.

(10) Patent No.: US 10,614,319 B2
(45) Date of Patent: Apr. 7, 2020

(54) PALLET LOCALIZATION SYSTEMS AND METHODS

(71) Applicant: John Bean Technologies Corporation, Chicago, IL (US)

(72) Inventors: Barry D. Douglas, Doylestown, PA (US); Vadim Linevich, Melrose, MA (US)

(73) Assignee: John Bean Technologies Corporation, Chicago, IL (US)

( * ) Notice: Subject to any disclaimer, the term of this patent is extended or adjusted under 35 U.S.C. 154(b) by 199 days.

(21) Appl. No.: 15/672,765

(22) Filed: Aug. 9, 2017

(65) Prior Publication Data

US 2018/0089517 A1   Mar. 29, 2018

Related U.S. Application Data

(60) Provisional application No. 62/373,017, filed on Aug. 10, 2016.

(51) Int. Cl.
| | |
|---|---|
| *G06K 9/00* | (2006.01) |
| *G06T 7/73* | (2017.01) |
| *G06T 7/593* | (2017.01) |
| *G06T 7/60* | (2017.01) |

(52) U.S. Cl.
CPC .......... *G06K 9/00791* (2013.01); *G06T 7/593* (2017.01); *G06T 7/60* (2013.01); *G06T 7/74* (2017.01); *G06T 2207/10028* (2013.01); *G06T 2207/20032* (2013.01); *G06T 2207/20076* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 9,327,406 B1* | 5/2016 | Hinterstoisser | ........ B25J 9/1697 |
| 2017/0091957 A1* | 3/2017 | Driegen | .................... G06T 7/62 |
| 2017/0316253 A1* | 11/2017 | Phillips | ..................... G06T 7/74 |

(Continued)

OTHER PUBLICATIONS

International Preliminary Report on Patentability dated Feb. 21, 2019, issued in corresponding Application No. PCT/US2017/046100, filed Aug. 9, 2017, 7 pages.

(Continued)

*Primary Examiner* — Wei Wen Yang
(74) *Attorney, Agent, or Firm* — Christensen O'Connor Johnson Kindness PLLC

(57) ABSTRACT

Systems and methods for localizing pallets using images based on point cloud data are disclosed. In one embodiment, a method for localizing a pallet includes acquiring, by a 3D camera, a first image of point cloud data, the first image being representative of the pallet. The method also includes generating a second image by (1) truncating the point cloud data of the first image, and (2) orthogonally projecting the remaining point cloud data of the first image. The method further includes generating a third image by creating a binary image from the second image, and generating a cross-correlation image by cross-correlating the third image with a template of a pallet pocket. The method also includes determining a rotation angle (R) of the pallet by analyzing the cross-correlation image.

19 Claims, 10 Drawing Sheets

(56) References Cited

U.S. PATENT DOCUMENTS

2018/0253857 A1* 9/2018 Driegen .................. G06T 7/62

OTHER PUBLICATIONS

Baglivo, L., et al., "Autonomous Pallet Localization and Picking for Industrial Forklifts: A Robust Range and Look Method," Measurement Science and Technology 22(8):085502, Aug. 2011, 11 pages.

Byun, S., and M. Kim, "Real-Time Positioning and Orienting of Pallets Based on Monocular Vision," Proceedings of the 20th IEEE International Conference on Tools With Artificial Intelligence (ICTAI '08), Nov. 2-5, 2008, Dayton, Ohio, pp. 505-508.

International Search Report and Written Opinion dated Oct. 18, 2017, issued in corresponding International Application No. PCT/US2017/046100, filed Aug. 9, 2017, 12 pages.

\* cited by examiner

PALLET LOCALIZATION SYSTEMS AND METHODS

CROSS-REFERENCE TO RELATED APPLICATION

This application claims the benefit of U.S. Provisional Patent Application No. 62/373,017, filed Aug. 10, 2016, which is incorporated herein by reference in its entirety.

FIELD OF THE INVENTION

The present invention relates generally to systems and methods for localizing pallets using point cloud data.

BACKGROUND

Pallets are widely used for goods handling and transportation. Typically, the pallets are repositioned by manned or unmanned vehicles (SGVs), for example by manned or unmanned fork lifts. The unmanned vehicles are called auto-guided vehicles (AGVs) or self-guided vehicles (SGVs) (hereinafter, collectively referred to as SGVs). To perform a pallet pick operation, an SGV must know the exact location and orientation of the pallet. In a typical warehouse, an approximate pallet location is usually known, and it can be obtained from a database or an inventory management system. Therefore, the SGV can use the known location of the pallet to drive toward the pallet. However, to perform a pick operation, the SGV must align against the pallet and must insert the forks inside the pallet pockets. To do this, the SGV needs to know an accurate pallet pose relative to itself.

With some conventional technologies, the pallets are stored in the racks. The racks physically constrain the pallet to a known location and orientation. To pick the pallet, an SGV can exploit this knowledge and blindly orient itself assuming that the expected pallet is where it is supposed to be. To verify a successful insertion of the forks, a bump sensor can be used to detect the front face of the pallet engaging the back of the forks.

With some conventional technologies, a laser point ranging sensor is mounted near the forks. The laser point sensor emits a light beam which is used to measure the distance to a target object. If mounted next to the forks, these sensors can be used to check whether the forks are going to clear the pockets.

With some conventional technologies, a 2D laser scanner emits laser beams in a plane. These 2D laser beams can be used to identify the locations of the pallet pockets. Furthermore, sonar sensors can be used to determine whether or not the forks can clear the pockets. Sonar sensors emit ultrasonic sound waves, and can measure time required for the return trip of the ultrasonic sound waves, thus determining a distance to the pockets.

With some other technologies, a 2D camera or a stereo camera can obtain an image of the pallet. Next, image processing algorithms can be used to identify the pallet pockets based on edge detection, template matching, or color matching.

However, the conventional technologies may be imprecise in some situations, especially when the true orientation of the pallet is not known. Furthermore, some conventional technologies require a significant computational effort. Therefore, a need remains for pallet detection technologies that produce accurate location of the pallet.

DESCRIPTION OF THE DRAWINGS

The foregoing aspects and the attendant advantages of the present technology will become more readily appreciated with reference to the following detailed description, when taken in conjunction with the accompanying drawings, wherein.

DETAILED DESCRIPTION

Specific details of several embodiments of pallet localization are described. Briefly, the inventive pallet localization technology includes imaging a pallet and collecting point cloud data using a 3D camera that may be attached to a fork lift. The points in the cloud can be projected to a 2D plane, forming a 2D image. This image can be processed to determine the locations of the pallet pockets using, for example, cross-correlation between the 2D image of the pallet and known shapes of the pallet pocket. Furthermore, the orientation of the pallet (i.e., the roll, yaw, and pitch angles of the pallet) can be determined by constructing a plane through the surfaces of the pallet that surround the pallet pockets. Once the true location and orientation of the pallet is known, the SGV can orient the forks against the pallet pocket to pick the pallet. Furthermore, the inventive technology can also be applied with the fork lifts that are man-operated to, for example, assist the operator in picking the pallet.

In at least some embodiments, the inventive technology can be used with the pallets that are partially or fully wrapped in clear plastic wrap; are partially damaged and/or have chipped edges; have pallet pockets partially obstructed by hanging pallet wrap, packaging, broken wood; and/or have been repaired in the past and have extra boards retrofitted to boost structural integrity. In at least some embodiments, the accuracy, safety and cost of the operation are improved in comparison to the conventional technologies.

Figure 1:
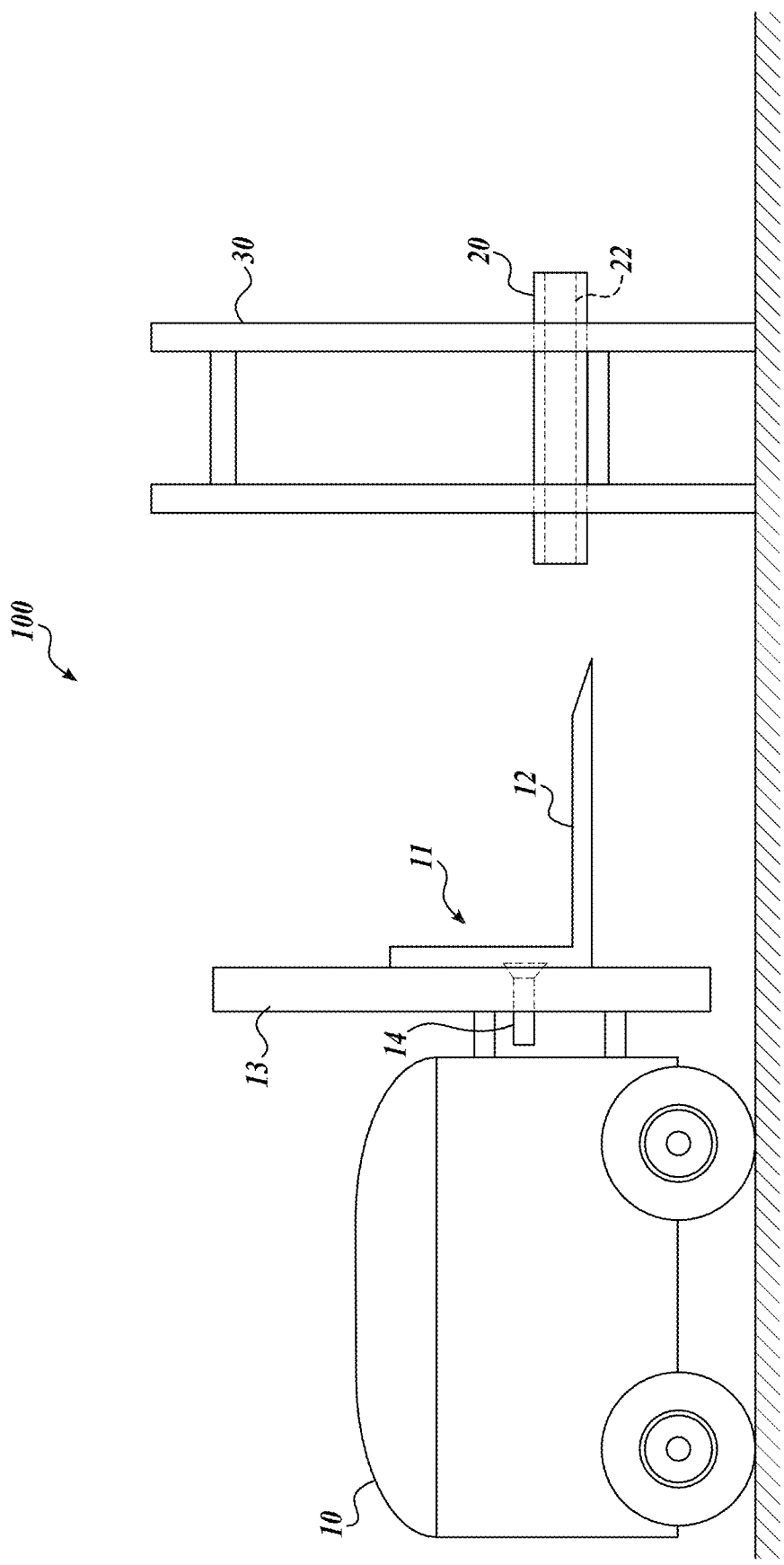
FIG. 1 is a side view of a fork lift configured in accordance with an embodiment of the presently disclosed technology.

FIG. 1 is a side view of a fork lift 10 configured in accordance with an embodiment of the presently disclosed technology. The fork lift 10 can be an unmanned vehicle, for example the SGV. A 3D camera 14 can be attached to a carriage 11 associated with forks 12 or other parts of the fork lift 10, for example, the mast 13. A warehouse 100 includes a shelving 30 that carries a pallet 20. In some instances, the pallet 20 may be partially obstructed by, for example, the load of the pallet or the wrapping that secures the load. Therefore, pallet pockets 22 may also be partially obstructed.

Figure 2:
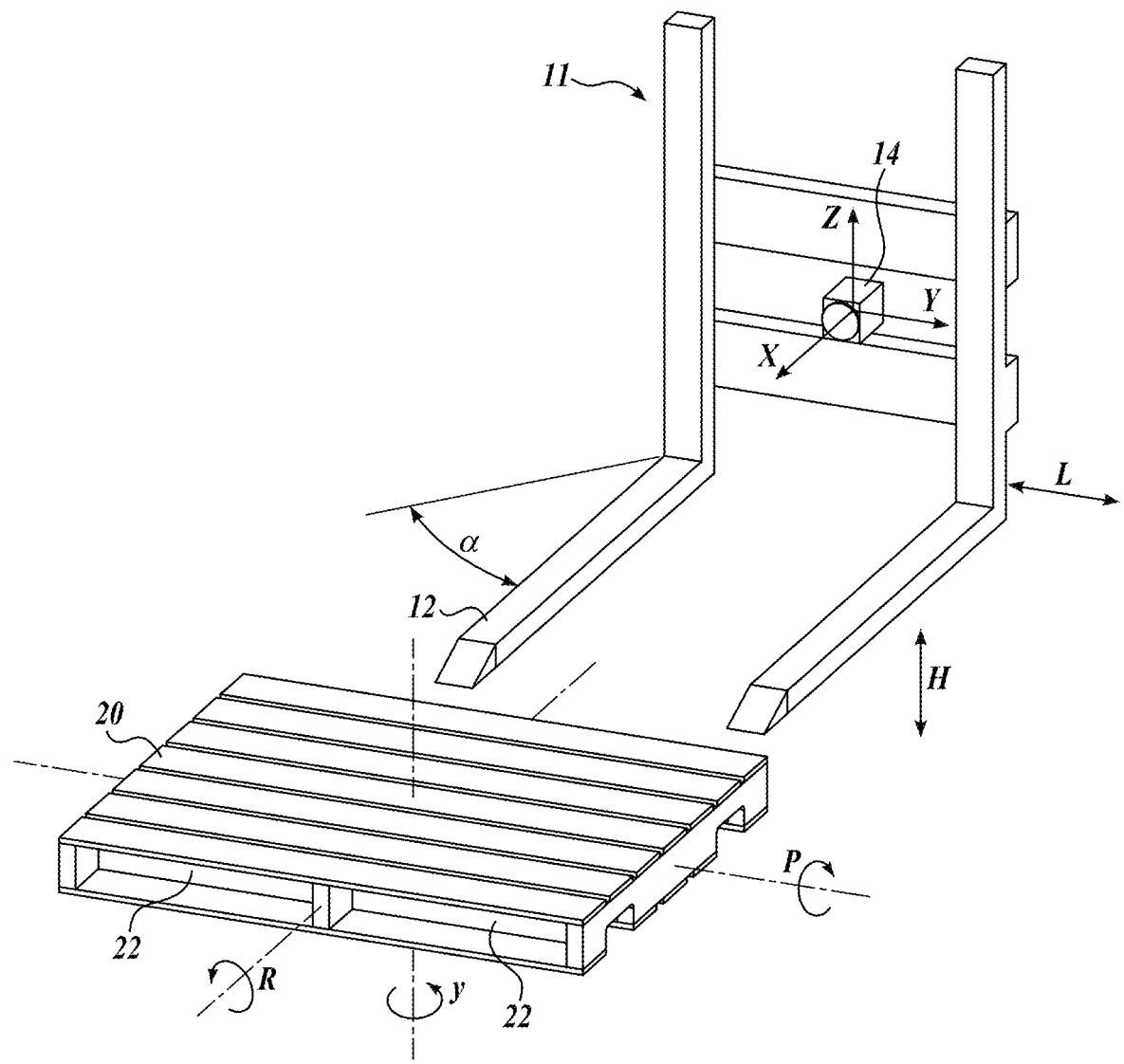
FIG. 2 is a partially schematic, isometric view of the forks of a fork lift configured in accordance with an embodiment of the presently disclosed technology.

FIG. 2 is a partially schematic, isometric view of the forks 12 and associated carriage 11 of the fork lift configured in accordance with an embodiment of the presently disclosed technology. The forks 12 face the pallet 20. In many applications, a location and orientation of the pallet 20 is known only to a certain degree within the warehouse. For example, the location of the pallet 20 may be known within +/−0.5 meters, but this level of accuracy may not be sufficient for the SGV to autonomously pick up the pallet. Furthermore, the exact roll (R), pitch (P) and yaw (Y) angles of the pallet may not be known. When the precise pallet location and R, P, Y angles are determined, the pose of the fork 12 can be adjusted by, for example, adjusting its height (H), lateral position (L) and a yaw angle (α) to more accurately face the target pallet 20.

In some embodiments, the location of the pallet 20 relative to the location of the forks 12 can be determined using the time-of-flight 3D camera 14. Some time-of-flight 3D cameras emit modulated infrared light and measure the time that the infrared signal takes to travel from the camera to the object and back again. The elapsed time, or "time of flight," corresponds to a distance from a particular point on the object to the camera. A collection of the data points acquired by the 3D camera image (corresponding to the points on the object, e.g., a pallet) is called point cloud data. The 3D camera can associate the point cloud data (e.g., points in the image) with XYZ locations of the particular points on the pallet 20. When viewed on a 2D monitor or paper printout, the point cloud data looks as a pixelated image where the points have different intensity, color and/or symbol. However, within the point cloud data file, the points are associated with their respective XYZ coordinates, therefore mapping the object (e.g., a pallet) within the XYZ plane.

An example of a 3D camera is an IFM O3D303 camera by Ifm Efector, Inc., Malvern, Pa. Other 3D cameras can also be used. The 3D camera may include a programmable processor, which may be configured to process the images obtained by the camera. Some 3D cameras may use other coordinate systems, for example, a polar or a spherical coordinate system.

Figure 3:
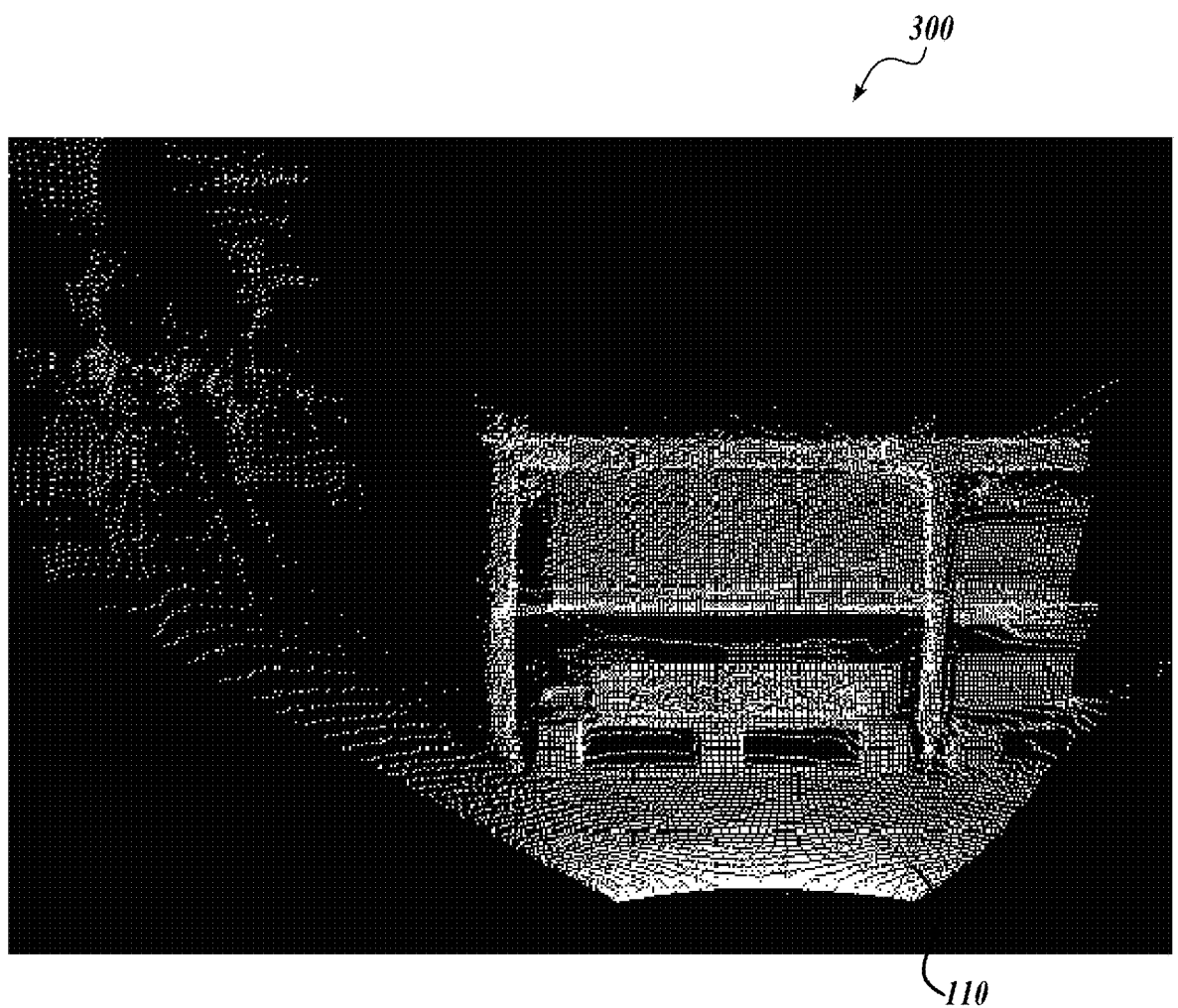
FIG. 3 is an image of point cloud data in accordance with an embodiment of the presently disclosed technology.

FIG. 3 is an image 300 of point cloud data 110 in accordance with an embodiment of the presently disclosed technology. In some embodiments, the intensity or color of point cloud data 110 corresponds to a distance from the 3D camera 14. Generally, the points that are brighter are closer to the 3D camera.

Figure 4:
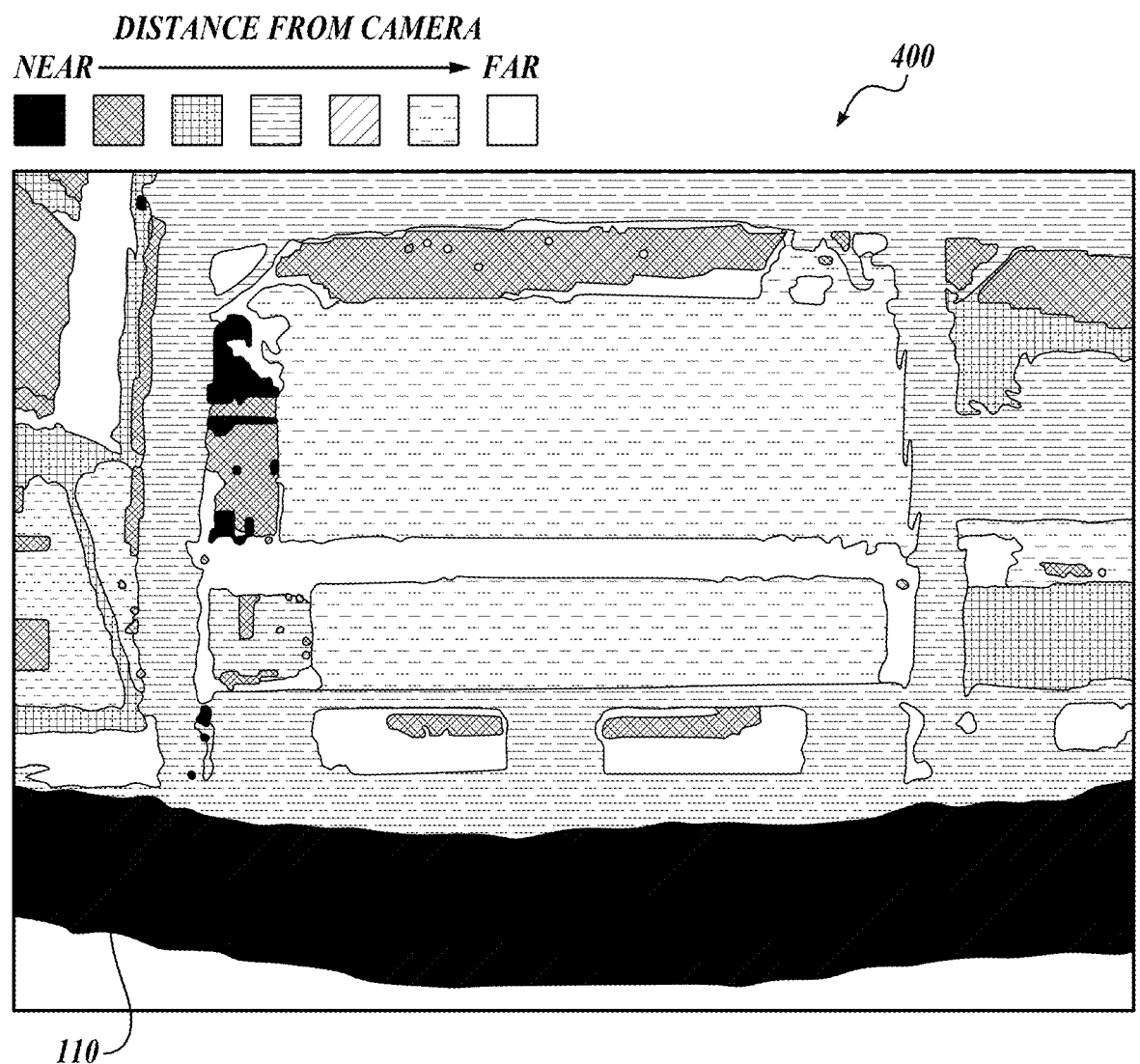
FIG. 4 is an image of a projection of the point cloud data in accordance with an embodiment of the presently disclosed technology.

FIG. 4 is an image 400 of a projection of the point cloud data 110 in accordance with an embodiment of the presently disclosed technology. In some embodiments, the point cloud data 110 shown in FIG. 3 may be projected along the axis X (the axis that is perpendicular to the plane of paper) onto the YZ plane (the plane of paper). Different intensities (or colors or symbols) of the point cloud data 110 can represent distances of particular points on the pallet 20 from the 3D camera 14. Therefore, in some embodiments, the image in FIG. 4 can be interpreted as a 2D map (in the YZ plane) of the point distances (in the X direction) from the 3D camera 14.

Figure 5:
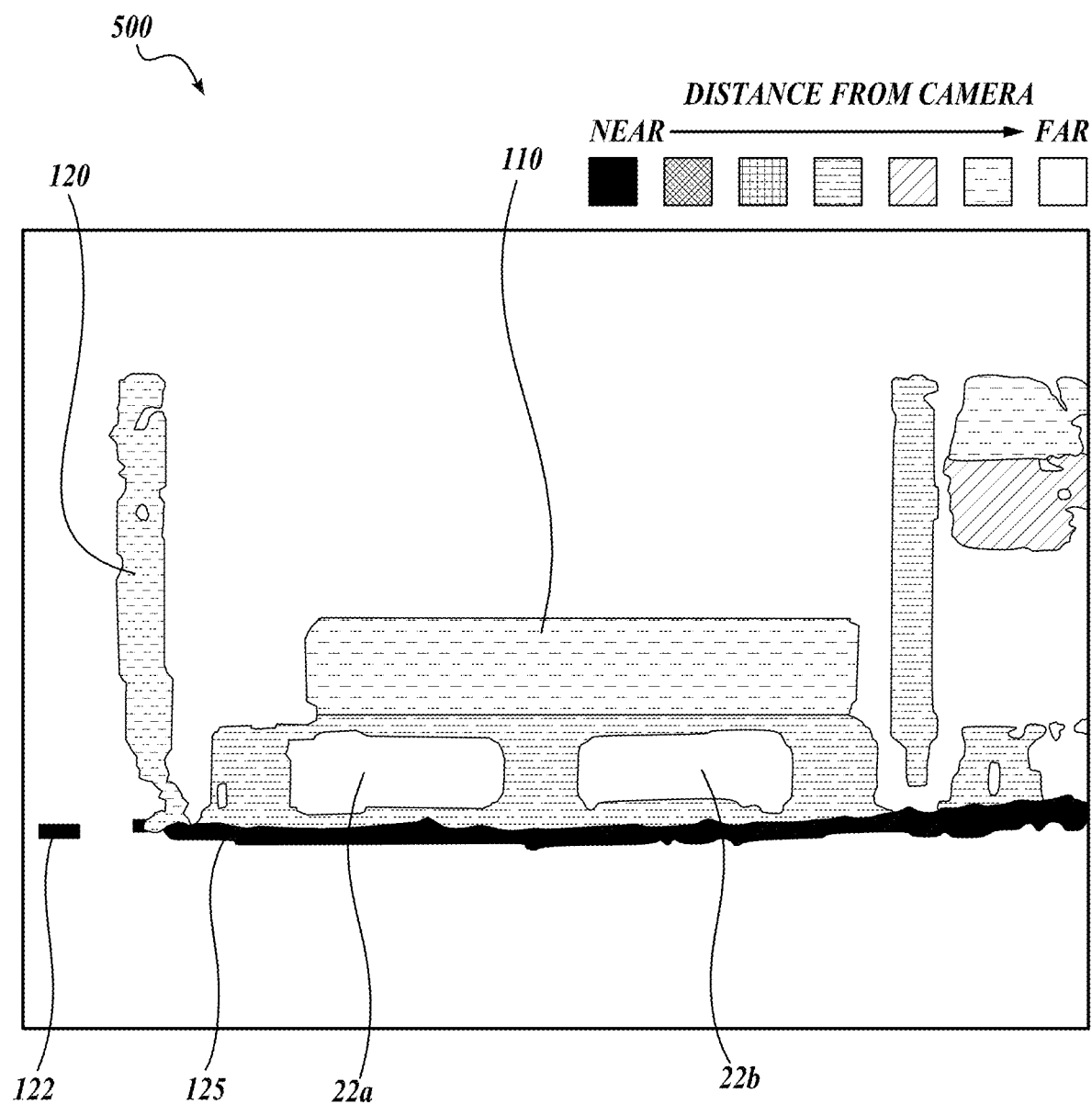
FIG. 5 is an image of the projection of the point cloud data with near/far field removed in accordance with an embodiment of the presently disclosed technology.

FIG. 5 is an image 500 of the projection of the point cloud data with near/far field removed in accordance with an embodiment of the presently disclosed technology. The near/far fields may be chosen based on a provided distance hint input, for example, "the expected location of the pallet is 1 m." Based on such a hint, the point cloud data that are outside of a distance range (e.g., outside of the distance of 1 m+/−25 cm from the 3D camera) may be removed. After the removal, the point cloud data 110 that remain in the image 500 are within the prescribed distance range (e.g., 1 m+/−25 cm). In some embodiments, the distance range can be specified before the point cloud data are acquired by the 3D camera 14 (e.g., the expected distance of the pallet from the 3D camera is 1 m). In some embodiments, the intensity, color or associated symbol of the point cloud data 110 represents a distance of the corresponding points on the pallet from the 3D camera 14. For example, lighter areas 22a and 22b may correspond to the pallet pockets. An area 120 may correspond to, for example, vertical walls of the shelving, and a horizontal area 125 may correspond to a base of a shelf or to the flooring of the warehouse. In some embodiments, a median filter can be applied to the point cloud data of the image 500. The median filter replaces the value of the point in the point cloud data with an average value of its neighboring points. In at least some embodiments, the median filter tends to preserve the edges in the image, while removing the noise.

Figure 6:
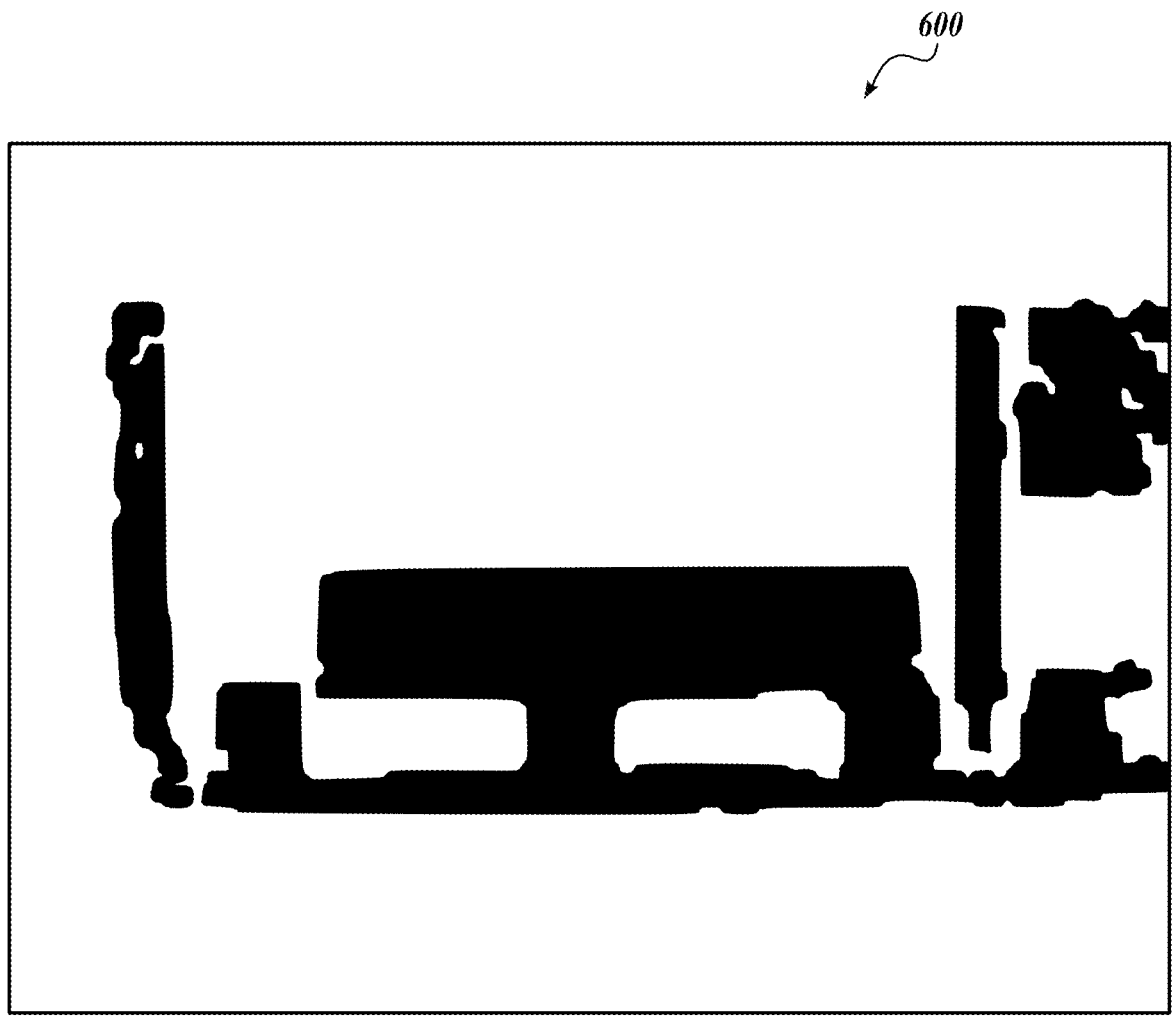
FIG. 6 is a binary image of the projection of the point cloud data in accordance with an embodiment of the presently disclosed technology.

FIG. 6 is a binary image 600 of the projection of the point cloud data in accordance with an embodiment of the presently disclosed technology. In some embodiments, the image 600 can be obtained from the image 500 by setting all the point cloud data 110 that remained inside the distance range to the value of 1. All other point cloud data may be set to zero. A filter may be used to simplify the image 500. For example, a "salt-and-pepper" filter can be used to remove relatively small, isolated islands of point cloud data, e.g., a group of point cloud data 122 shown in the image 500 of FIG. 5. As explained below, in some embodiments, the subsequent processing of the images may be simplified if the image 600 is a binary image.

Figure 7:
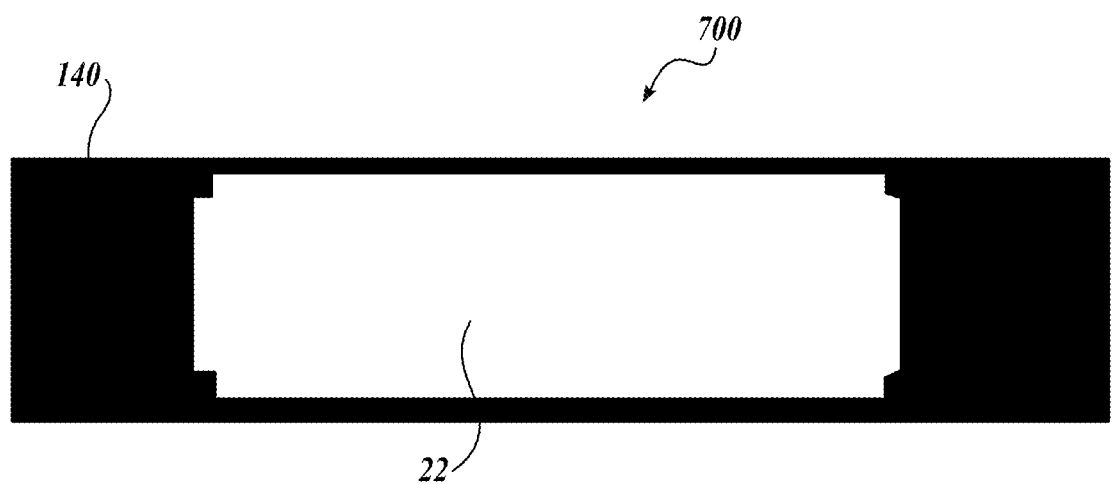
FIG. 7 is an image corresponding to a pallet template in accordance with an embodiment of the presently disclosed technology.

FIG. 7 is an image 700 corresponding to a pallet template in accordance with an embodiment of the presently disclosed technology. The illustrated pallet template includes an outline of the pallet pocket 22 and a surrounding area 140. Different pallet templates can be created prior to pallet localization, and stored on the system. These pallet templates can be accessed depending on the type of the pallet expected to be present in a given location. The use of the pallet template is explained with reference to FIG. 8 below.

Figure 8:
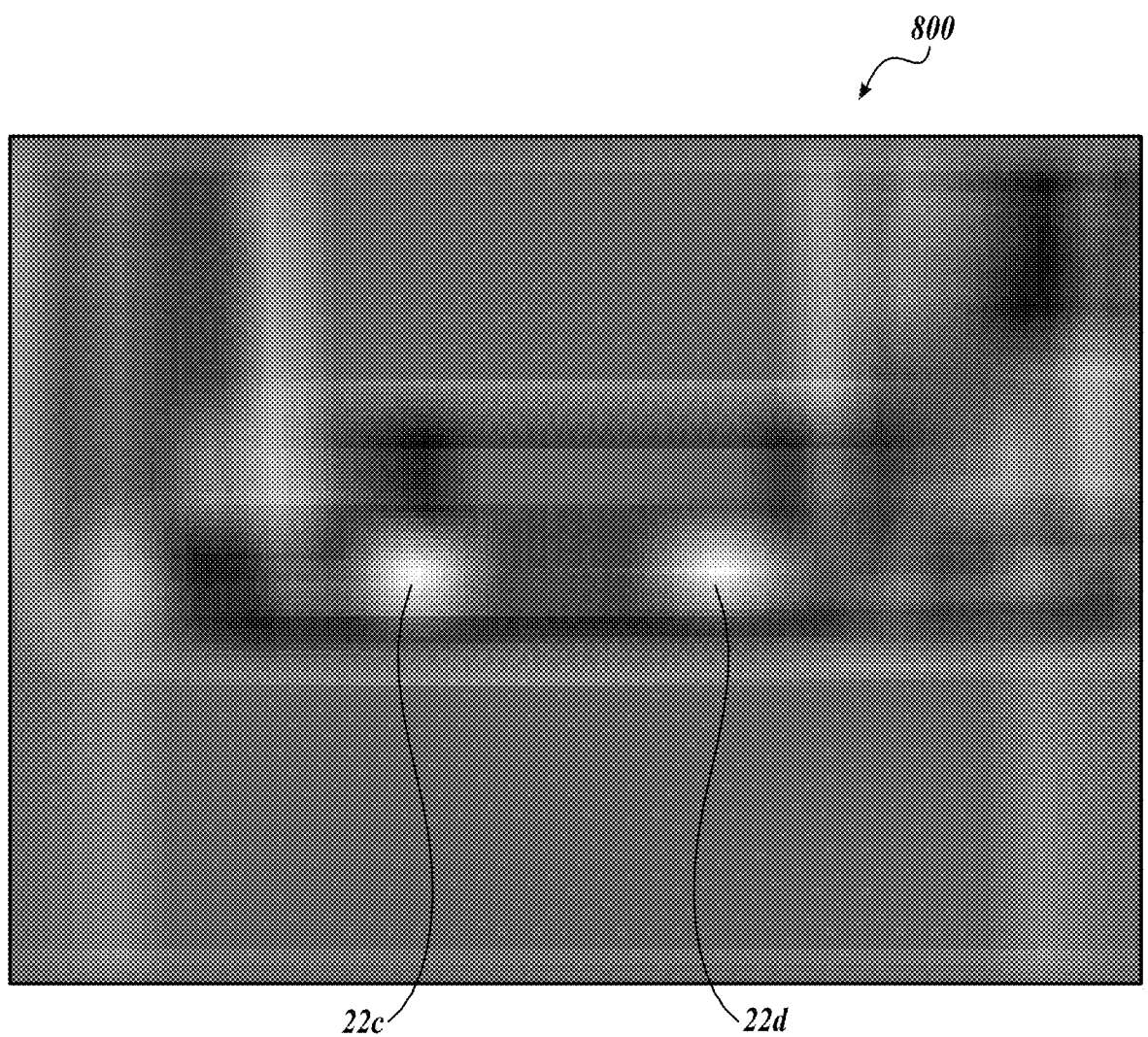
FIG. 8 is an image of cross-correlation results in accordance with an embodiment of the presently disclosed technology.

FIG. 8 is an image 800 of cross-correlation results in accordance with an embodiment of the presently disclosed technology. In some embodiments, the image 800 may be obtained by calculating a cross-correlation between the pallet template 700 of FIG. 7 and the binary image 600 of FIG. 6. The cross-correlation can be calculated for different segments of the image 600 by "sliding" the pallet template 700 over the binary image of the image 600. Generally, the cross-correlation will be the highest when the pallet pocket 22 of image 700 corresponds to (e.g., overlays) one of the pallet pockets 22a, 22b of the graph 600. The areas of the high cross-correlation will show as bright spots 22c, 22d in image 800. In at least some embodiments, once the expected locations of the pallet pockets (e.g., the locations of the bright spots 22c, 22d) are determined, the roll angle (R) of the pallet can also be determined by, for example, drawing a straight line through the bright spots 22c, 22d. Determination of the yaw (Y) and pitch (P) angles of the pallet is explained with reference to FIG. 9 below.

Figure 9:
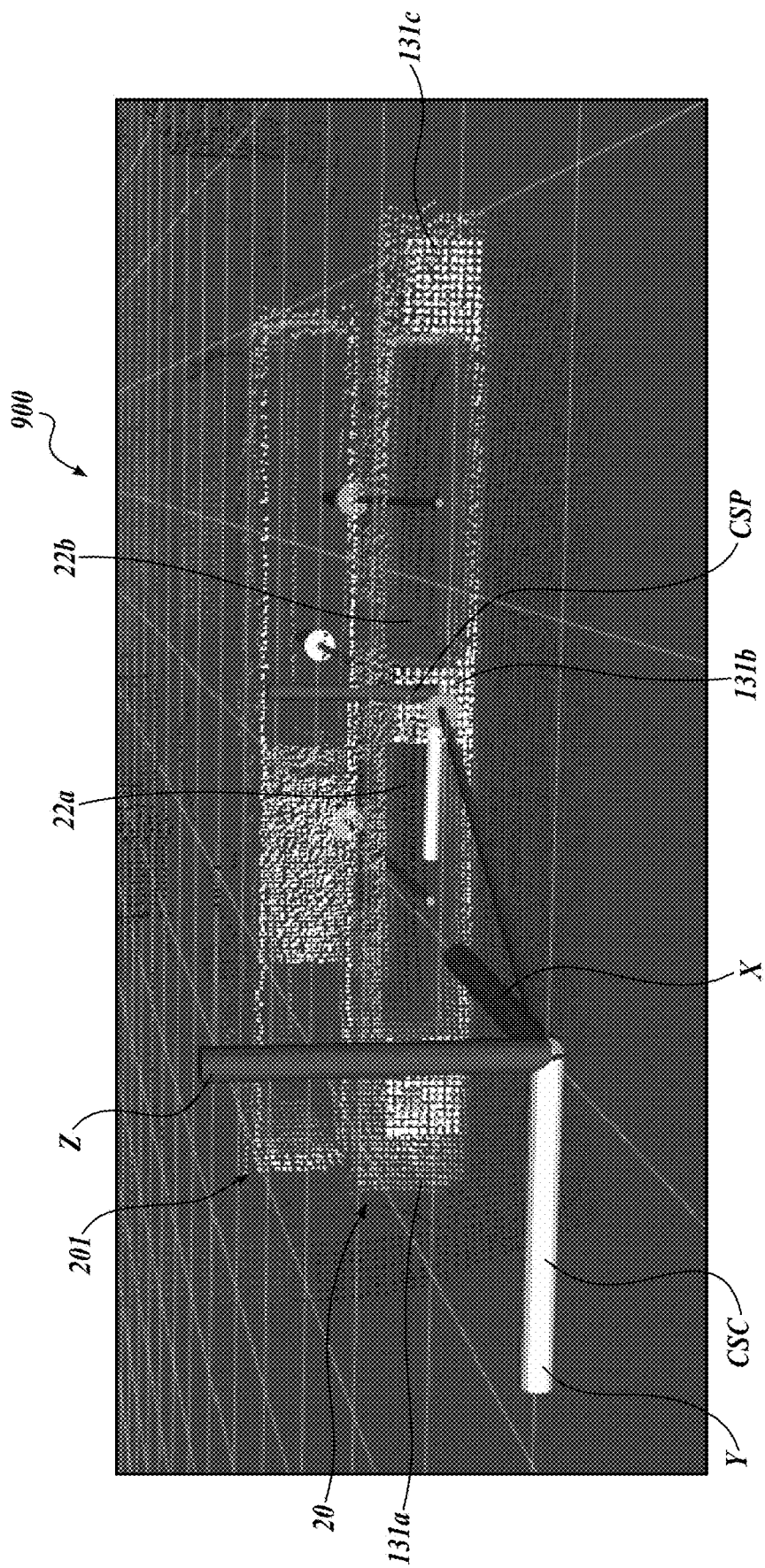
FIG. 9 is an image of pallet localization results in accordance with an embodiment of the presently disclosed technology.

FIG. 9 is an image 900 of pallet localization results in accordance with an embodiment of the presently disclosed technology. The sample image 900 includes two pallets: a target pallet 20, and a load or obstruction pallet 201. The image 900 includes two coordinate systems: a coordinate system CSC corresponding to a 3D camera (e.g., coordinate system XYZ of the 3D camera 14) and a coordinate system CSP corresponds to the pallet 20. In at least some embodiments, once the locations of the pallet pockets 22a, 22b are known, the location of the faces 131a-131c in the YZ plane can also be determined using the known pallet template 700. For example, for a typical pallet, the location of the surface 131b is generally midway between the pallet pockets 22a, 22b. Furthermore, the locations of the surfaces 131a and 131c in the YZ plane can be determined based on the pallet pockets 22a, 22b and a known width of the pallet pockets for a given pallet type represented by the pallet template 700.

In some embodiments, the roll (R), yaw (Y) and/or pitch (P) angles of the pallet 20 may be determined based on the location of the surfaces 131a-131c in the XYZ coordinate system of the 3D camera 14. For example, a subset of the point cloud data that corresponds to the surface 131a-131c of the pallet can be identified from the image 300. These subsets of data cloud points are illustrated in the image 900 where a distance of the data points from the 3D camera 14 corresponds to the intensity of the pixel in the image 900. Other representations of the distance of the surfaces 131a-131c from the 3D camera 14 are also possible.

Having identified the data points that correspond to the surfaces 131a-131c in the XYZ coordinate system (e.g., coordinate system CSC), a Random Sample Consensus (RANSAC) method may be used to construct a plane that passes relatively closely to the surfaces 131a-131c. Other plane construction methods are also possible. Next, based on the constructed plane, the roll (R), the yaw (Y) and pitch (P) of the pallet can be calculated, therefore determining the location and the orientation of the pallet 20. For example, a unit vector that is perpendicular to the plane (e.g., the plane constructed by the RANSAC method) may be decomposed to its X, Y and Z components corresponding to the cosine of the respective angles between the unit vector and the coordinate axis X, Y and Z. In some embodiments, the SGV can use thus determined location and orientation of the pallet to orient the forks 12 against the pallet pockets 22, and to engage and manipulate the pallet.

Figure 10:
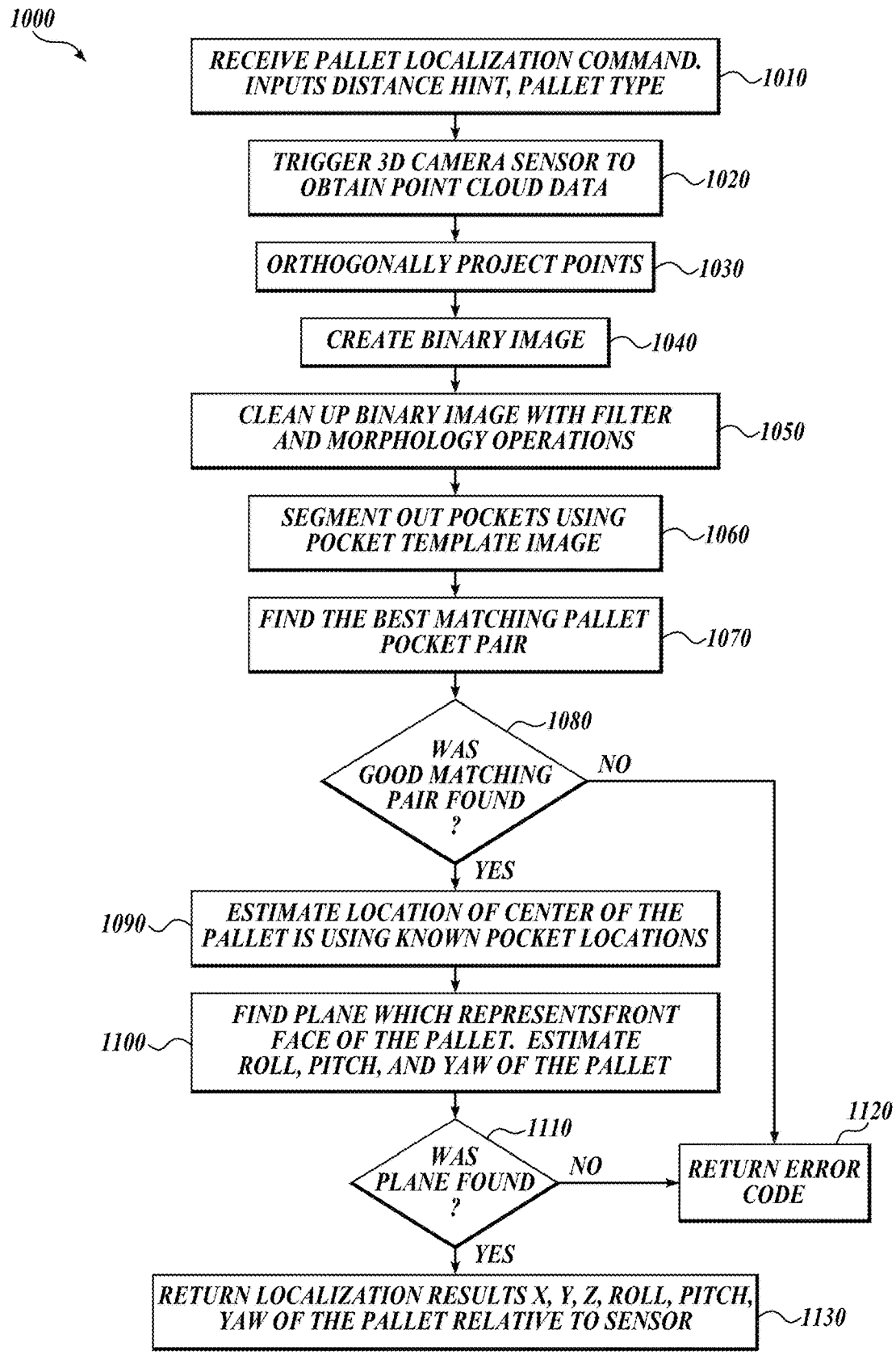
FIG. 10 is a flow chart of a pallet detection method in accordance with an embodiment of the presently disclosed technology.

FIG. 10 is a flow chart 1000 of a pallet detection method in accordance with an embodiment of the presently disclosed technology. In some embodiments, the pallet detection method can be executed without all the steps shown in the flow chart 1000, and/or additional steps not shown in the flow chart 1000 may be used.

In step 1010, the pallet localization command is received by the 3D camera on the SGV. The pallet localization command may include a distance hint and/or a pallet type.

In step 1020, the 3D camera acquires the point cloud data. In at least some embodiments, the SGV that carries the 3D camera is in the vicinity of the target pallet, and the 3D camera is generally oriented toward the pallet in the direction X.

In step 1030, the point cloud data are orthogonally projected on the Y-Z plane of the 3D camera, and the point cloud data are truncated based on the distance hint. For example, the image 300 can be projected to the Y-Z plane, and then truncated by discarding the points that are outside of, e.g., 1 m+/−25 cm distance X from the camera.

In step 1040, the orthogonally projected point cloud data are converted into a binary image. In step 1050, the binary image is filtered, for example, by a "salt and pepper" filter.

In step 1060, an image segment that represents a pallet pocket is cross-correlated with the binary image of step 1050. The image segment may correspond to a specific pallet type. Multiple image segments corresponding to different pallet types may be used, and the pallet image segment that produces the highest correlation is tagged in step 1070.

In step 1080, a determination about the closeness of the matching pallet type is made. If a good match is not found, the method returns an error code in step 1120. If a good match is found, the method proceeds to step 1090 to estimate the center of the pallet based at least in part on the locations of the high value of the cross-correlation between the binary image of the point cloud data and the image segment that represents the pocket template.

In step 1100, based on the estimate of the step 1090, a plane is constructed to represent the front face of the pallet. The R, Y, and P angles of the pallet can be estimated based on the constructed plane.

In step 1110, a determination is made whether the plane was found. If the plane was not found, the method returns an error code in step 1120. If the plane was found, in step 1130 the localization results are produced. The localization results may specify X, Y, Z location of parts of the pallet (e.g., the pockets), and/or the R, Y, P angles of the pallet with respect to the 3D camera. Since the position of the 3D camera with respect to the forks of the SGV is generally known, the SGV can also know its position with respect to the pallet. Based on this knowledge, the SGV can set position of the forks 12 to properly engage the pockets of the pallet.

In some embodiments, the 3D camera sensor may run a Linux based o3dxx-firmware and libo3d3xx drivers developed by Love Park Robotics LLC to achieve low level camera control. The firmware and the drivers can be installed on the 3D camera's embedded system. When triggered, the driver sends appropriate signals to the camera to capture the point cloud data. The embedded system may have a pallet detector daemon process running in the background. The process listens and responds to messages over TCP/IP interface.

The 3D camera may use TCP/IP communication protocol for instructions and data. Other communication protocols are also possible.

Many embodiments of the technology described below may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described below may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

From the foregoing, it will be appreciated that specific embodiments of the technology have been described herein for purposes of illustration, but that various modifications may be made without deviating from the disclosure. For example, in some embodiments, an EPROM chip may be a part of the 3D camera, and may carry instructions for the image processing. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

The embodiments of the invention in which an exclusive property or privilege is claimed are defined as follows:

1. A method for localizing a pallet comprising:
   acquiring, by a 3D camera, a first image of point cloud data, wherein the first image is representative of the pallet;
   generating a second image by:
      truncating the point cloud data of the first image, and
      after the truncating, orthogonally projecting remaining point cloud data of the first image;
   generating a third image by creating a binary image from the second image;
   determining cross-correlation values by cross-correlating the third image with a template of a pallet pocket
   generating a cross-correlation image from the cross-correlation values; and
   determining a rotation angle (R) of the pallet by analyzing the cross-correlation image, wherein determining the rotation angle (R) of the pallet is based on drawing a straight line through the highest values of the cross-correlation image within two separate areas.

2. The method of claim 1, wherein creating the binary image from the second image is based on setting the point cloud data of the second image to a fixed value.

3. The method of claim 1, further comprising:
   determining a distance from the 3D camera to the pallet.

4. The method of claim 1, further comprising constructing a plane corresponding to a front of the pallet.

5. The method of claim 4, wherein constructing the plane corresponding to the front of the pallet is done at least in part using a Random Sample Consensus (RANSAC) method.

6. The method of claim 4, further comprising:
   determining a yaw angle (Y) and a pitch angle (P) of the pallet.

7. The method of claim 6, wherein the 3D camera is carried by a self-guided vehicle (SGV), the method further comprising:
   determining a height (H), a lateral position (L) and a yaw angle ($\alpha$) of a fork of the SGV.

8. The method of claim 1, further comprising applying at least one filter to each of the second and third images.

9. The method of claim 8, wherein the at least one filter is a median filter applied to the second image.

10. The method of claim 8, wherein the at least one filter is a salt-and-pepper filter applied to the third image.

11. The method of claim 1, wherein the 3D camera is carried by a man-operated fork lift.

12. The method of claim 1, wherein the pallet is partially or fully wrapped in clear plastic wrap; is partially damaged; has chipped edges; has pallet pockets partially obstructed by hanging pallet wrap, packaging, or broken wood; and/or has been repaired and has extra boards retrofitted for structural integrity.

13. The method of claim 1, wherein the first image of point cloud data is based on time of flight distance from the 3D camera.

14. A system for localizing a pallet comprising:
   a 3D camera configured to acquire point cloud data, wherein the system is configured to:
      acquire a first image of point cloud data, wherein the first image is representative of the pallet;
      generate a second image by:
         truncating the point cloud data of the first image, and
         after the truncating, orthogonally projecting remaining point cloud data of the first image;
      generate a third image by creating a binary image from the second image;
      determine cross-correlation values by cross-correlating the third image with a template of a feature of the pallet
      generate a cross-correlation image from the cross-correlation values;
      determine a rotation angle (R), a yaw angle (Y), and a pitch angle (P) of the pallet, wherein the rotation angle (R) of the pallet is based on drawing a straight line through the highest values of the cross-correlation image within two separate areas; and
      determine the distance from the 3D camera to the pallet.

15. The system of claim 14, wherein the feature of the pallet is a pallet pocket.

16. The system of claim 14, further comprising a self-guided automated vehicle (SGV) that carries the 3D camera.

17. The system of claim 14, further comprising a manned fork lift that carries the 3D camera.

18. The system of claim 14, wherein the 3D camera includes a processor configured to process images.

19. The system of claim 14, wherein the pallet is partially or fully wrapped in clear plastic wrap; is partially damaged; has chipped edges; has pallet pockets partially obstructed by hanging pallet wrap, packaging, or broken wood; and/or has been repaired and has extra boards retrofitted for structural integrity.

* * * * *